United States Patent
Tsai

(10) Patent No.: US 9,826,469 B2
(45) Date of Patent: Nov. 21, 2017

(54) METHOD AND COMMUNICATIONS DEVICE FOR IMPROVING FREQUENCY BAND SUPPORT

(71) Applicant: Acer Incorporated, New Taipei (TW)

(72) Inventor: Wei-Chieh Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/141,795

(22) Filed: Apr. 28, 2016

(65) Prior Publication Data

US 2016/0381626 A1   Dec. 29, 2016

(30) Foreign Application Priority Data

Jun. 24, 2015 (TW) .............................. 104120261 A

(51) Int. Cl.
*H04W 48/18* (2009.01)
*H04W 48/16* (2009.01)
(Continued)

(52) U.S. Cl.
CPC ......... *H04W 48/16* (2013.01); *H04W 76/023* (2013.01); *H04W 76/027* (2013.01);
(Continued)

(58) Field of Classification Search
CPC . H04W 48/16; H04W 76/023; H04W 76/027; H04W 60/04; H04W 48/18; H04W 88/04
(Continued)

(56) References Cited

U.S. PATENT DOCUMENTS

| 6,119,003 A | 9/2000 | Kukkohovi |
| 7,167,707 B1 | 1/2007 | Gazzard et al. |

(Continued)

FOREIGN PATENT DOCUMENTS

| EP | 2 214 441 | 8/2010 |
| EP | 2 387 279 | 11/2011 |

(Continued)

OTHER PUBLICATIONS

Office Action dated May 30, 2016 Taiwan Patent Office in priority application No. 104120261.

(Continued)

*Primary Examiner* — Cong Tran
(74) *Attorney, Agent, or Firm* — McClure, Qualey & Rodack, LLP

(57) ABSTRACT

A communications device for improving frequency band support includes a radio frequency signal processing device, a baseband signal processing device, a memory device and a processor. The RF signal processing device processes RF signals to generate baseband signals. The baseband signal processing device processes the baseband signals. The processor determines whether the communications device supports at least one frequency band of a first type of communication service supported by a network; and performs a scanning procedure according to a priority when the communications device does not support the at least one frequency band, wherein the scanning procedure includes scanning all frequency bands of the first type of communication service supported by the communications device.

18 Claims, 5 Drawing Sheets

(51) Int. Cl.
*H04W 76/02* (2009.01)
*H04W 60/04* (2009.01)
*H04B 1/00* (2006.01)
*H04W 88/06* (2009.01)

(52) U.S. Cl.
CPC ........... *H04B 1/0053* (2013.01); *H04W 48/18* (2013.01); *H04W 60/04* (2013.01); *H04W 88/06* (2013.01)

(58) Field of Classification Search
USPC ........... 455/434, 435.2–0.3, 436–439, 166.2, 455/188.1, 3.04; 370/331–332, 329
See application file for complete search history.

(56) References Cited

U.S. PATENT DOCUMENTS

| | | | | |
|---|---|---|---|---|
| 9,516,694 | B2* | 12/2016 | Gopal | H04W 76/048 |
| 2007/0140163 | A1* | 6/2007 | Meier | H04W 8/005 |
| | | | | 370/329 |
| 2010/0111013 | A1* | 5/2010 | Chou | H04W 24/02 |
| | | | | 370/329 |
| 2011/0263252 | A1 | 10/2011 | Saini et al. | |
| 2011/0268092 | A1* | 11/2011 | Tiwari | H04W 60/02 |
| | | | | 370/335 |
| 2011/0300844 | A1 | 12/2011 | Kim et al. | |
| 2012/0190361 | A1 | 7/2012 | Shaikh et al. | |
| 2012/0264425 | A1 | 10/2012 | Krishnamoorthy et al. | |
| 2013/0142059 | A1 | 6/2013 | Di Girolamo et al. | |
| 2013/0237220 | A1 | 9/2013 | Lee et al. | |
| 2013/0273913 | A1* | 10/2013 | Swaminathan | H04W 48/16 |
| | | | | 455/434 |
| 2014/0066061 | A1 | 3/2014 | Lou et al. | |
| 2014/0153408 | A1* | 6/2014 | Jun | H04L 65/1066 |
| | | | | 370/250 |
| 2014/0323179 | A1* | 10/2014 | Selgert | G01S 5/0072 |
| | | | | 455/552.1 |
| 2015/0043533 | A1 | 2/2015 | Kim et al. | |
| 2015/0056985 | A1 | 2/2015 | Swaminathan et al. | |
| 2015/0351012 | A1* | 12/2015 | Chhabra | H04W 48/16 |
| | | | | 455/434 |
| 2016/0345229 | A1* | 11/2016 | Das | H04W 36/30 |

FOREIGN PATENT DOCUMENTS

| | | |
|---|---|---|
| TW | 201309056 | 2/2013 |
| WO | WO 2013/103511 | 7/2013 |

OTHER PUBLICATIONS

European Search Report dated Nov. 2, 2016, issued in application No. 16172586.7-1874.

* cited by examiner

METHOD AND COMMUNICATIONS DEVICE FOR IMPROVING FREQUENCY BAND SUPPORT

CROSS REFERENCE TO RELATED APPLICATIONS

This Application claims priority to Taiwan Patent Application No. 104120261, filed on Jun. 24, 2015. The content of the above applications are incorporated by reference in their entirety.

BACKGROUND OF THE INVENTION

Field of the Invention

Aspects of the present invention relate generally to a wireless communications system, and more particularly, to a method and a communications device for improving frequency band support.

Description of the Related Art

The term "wireless", normally refers to an electrical or electronic operation, which is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5 G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network. The LTE (Long Term Evolution) and the LTE-Advanced evolved from the LTE is a 4G mobile communications system, which provides a high-speed data transmission over the 2G and 3G system.

Generally, a registered public land mobile network (RPLMN) can support multiple frequencies. When a user equipment (UE) camps on the UMTS network which provides for wrong system information block (SIB) 19 for reselecting to the LTE network, the UE cannot reselect back to the LTE network even though the UE tries to turn on/off the airplane mode. More specifically, the current communications specification defines that the system information of the UMTS which the UE camps on will be saved in the RPLMN when the UE is turned off. However, the UE still camps back on the same cell which provides the wrong system information when the UE is rebooted. The case described above may result in the UE using the wrong system information, and cannot re-select back to the LTE network.

Thus, there is a need for a method and a device for improving frequency band support to solve the above problems.

BRIEF SUMMARY OF THE INVENTION

A method and a device for improving frequency band support are provided.

In a preferred embodiment, the invention is directed to a communications device for improving frequency band support. The communications device comprises a radio frequency (RF) signal processing device, a baseband signal processing device, a memory device, and a processor. The RF signal processing device processes a plurality of RF signals to generate a plurality of baseband signals. The baseband signal processing device processes the baseband signals. The processor determines whether the communications device supports at least one frequency band of a first type of communication service supported by a network, and performs a scanning procedure according to a priority when the communications device does not support the at least one frequency band, wherein the scanning procedure includes scanning all frequency bands of the first type of communication service supported by the communications device.

In some embodiments, after the communications device scans all the frequency bands of the first type of communication service supported by the communications device, the processor determines whether there is the at least one frequency band of the first type of communication service supported by the network, and transmits an ATTACH request message to the network to request to use the first type of communication service over the at least one frequency band when finding the at least one frequency band. In some embodiments, the communications device further receives an ATTACH accept message transmitted from the network, and uses the first type of communication service. In some embodiments, the communications device further receives an ATTACH failure message transmitted from the network, and stops the scanning procedure. In some embodiments, the communications device further receives an ATTACH failure message transmitted from the network, and re-performs the scanning procedure. In some embodiments, the communications device further comprises a counter. The counter counts a number of cell reselections when the communications device determines that there is no at least one frequency band, and the processor re-performs the scanning procedure when the number is greater than a threshold. In some embodiments, the communications device further comprises a timer. The processor starts the timer when the communications device determines that there is no at least one frequency band, and the processor re-performs the scanning procedure when the timer expires. In some embodiments, the communications device has a system information block (SIB), and the SIB includes a field corresponding to the first type of communication service. In some embodiments, before the determining step, the communications device uses a second type of communication service, wherein the first type of communication service has a higher priority than the second type of communication service. In some embodiments, the first type of communication service is long term evolution (LTE) service, and the second type of communication service is universal mobile telecommunications system (UMTS) service.

In a preferred embodiment, the invention is directed to a method for improving frequency band support, used in a communications device, comprising: determining whether the communications device supports at least one frequency band of a first type of communication service supported by a network; and performing a scanning procedure according to a priority when the communications device does not support the at least one frequency band, wherein the scanning procedure includes scanning all frequency bands of the first type of communication service supported by the communications device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
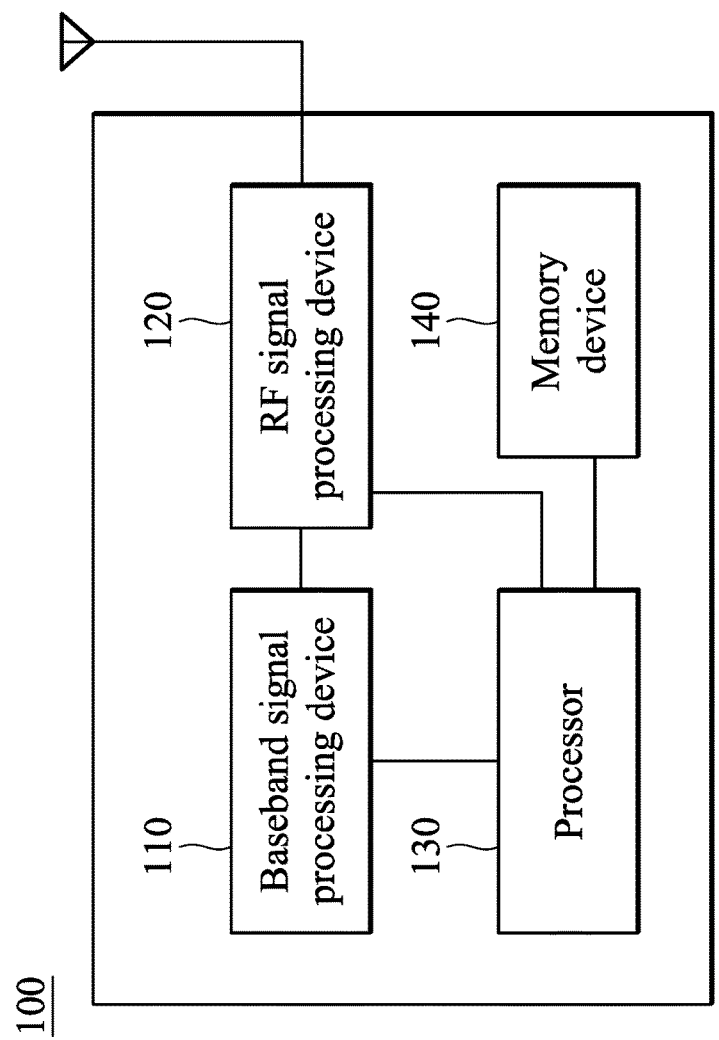
FIG. 1 shows a block diagram of a communications device according to an embodiment of the invention.

Several exemplary embodiments of the present disclosure are described with reference to FIGS. 1 through 4, which generally relate to a method and a device for improving frequency band support. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 shows a block diagram of a communications device 100 according to an embodiment of the invention. The communications device 100 may be an electronic device used to communicate voice and/or data to a base station, which in turn may communicate with a network of devices (e.g., public switched telephone network (PSTN), the Internet, etc.). In describing communications systems and methods herein, a communications device may alternatively be referred to as a User Equipment (UE), an access terminal, a subscriber station, a mobile terminal, a remote station, a user terminal, a terminal, a subscriber unit, etc. Examples of wireless communications devices include cellular phones, smartphones, personal digital assistants (PDAs), laptop computers, netbooks, e-readers, wireless modems, etc.

As shown in FIG. 1, the communications device 100 may comprise at least a baseband signal processing device 110, a radio frequency (RF) signal processing device 120, a processor 130, a memory device 140, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The peer communications apparatus may be, for example, though it is not limited to being, a base station, an eNode B, an access point, or other such devices in the wireless network. The RF signal processing device 120 may comprise a plurality of hardware elements to perform radio frequency conversion. For example, the RF signal processing device 120 may comprise a power amplifier, a mixer, or others.

The baseband signal processing device 110 may further process the baseband signals to obtain information or data transmitted by the peer communications apparatus, such as the system information carried by the peer communications apparatus in the RF signals. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110 and the RF signal processing device 120. According to an embodiment of the invention, the processor 130 may also be arranged to execute the program codes of the software module(s) of the corresponding baseband signal processing device 110 and/or the RF signal processing device 120. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the communications device 100.

According to an embodiment of the invention, the RF signal processing device 120 and the baseband signal processing device 110 may be collectively regarded as a radio module capable of communicating with a wireless network to provide wireless communications services in compliance with a predetermined Radio Access Technology (RAT). Note that, in some embodiments of the invention, the communications device 100 may further be extended to comprise more than one antenna and/or more than one radio module, and the invention should not be limited to what is shown in FIG. 1.

In addition, in some embodiments of the invention, the processor may be configured inside of the baseband signal processing device 110, or the communications device 100 may comprise another processor configured inside of the baseband signal processing device 110. Thus the invention should not be limited to the architecture shown in FIG. 1.

Figure 2:
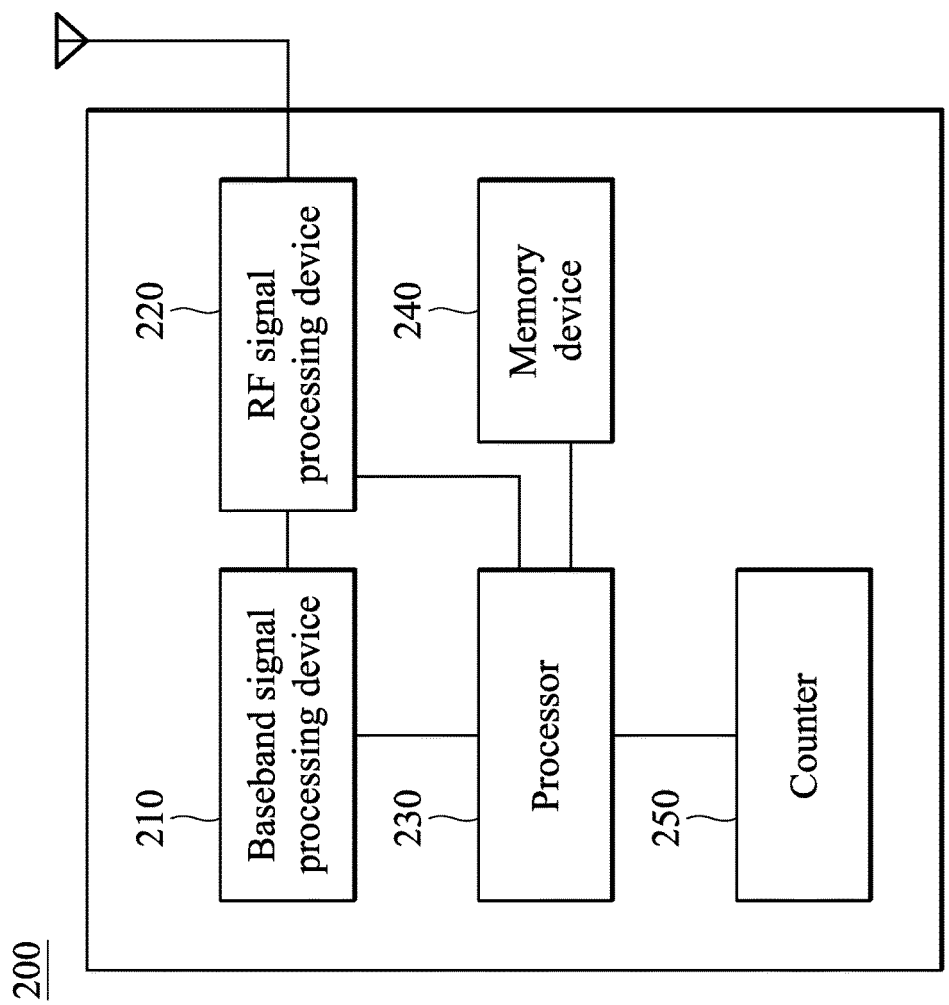
FIG. 2 shows a block diagram of a communications device according to another embodiment of the invention.

FIG. 2 shows a block diagram of a communications device 200 according to another embodiment of the invention. According to an embodiment of the invention, the communications device 200 may comprise at least a baseband signal processing device 210, a radio frequency (RF) signal processing device 220, a processor 230, a memory device 240, a counter 250, and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2.

The baseband signal processing device 210, the RF signal processing device 220, the processor 230, the memory device 240 in the communications device 200 have similar operations to the baseband signal processing device 110, the RF signal processing device 120, the processor 130, the memory device 140 in the communications device 100. Accordingly, FIG. 1 can be referred to for descriptions of the similar parts, and the details of these similar parts are not repeated for brevity. In one embodiment, the counter 250 is used to count a number of times. The processor 230 can perform corresponding programs when the number counted by the counter 250 is greater than a threshold.

Figure 3:
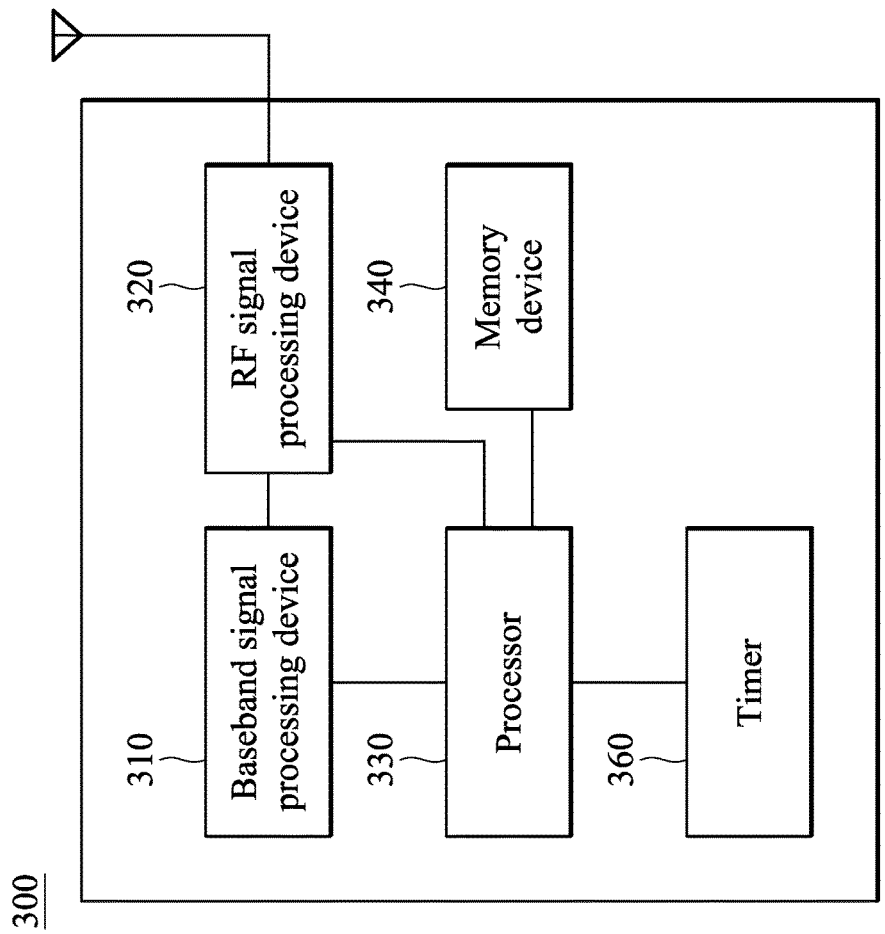
FIG. 3 shows a block diagram of a communications device according to another embodiment of the invention. According to an embodiment of the invention.

FIG. 3 shows a block diagram of a communications device 300 according to another embodiment of the invention. According to an embodiment of the invention. The communications device 300 may comprise at least a baseband signal processing device 310, a radio frequency (RF) signal processing device 320, a processor 330, a memory device 340, a timer 360, and an antenna module comprising at least one antenna. Note that, in order to clarify the concept of the invention, FIG. 3 presents a simplified block diagram in which only the elements relevant to the invention are shown. However, the invention should not be limited to what is shown in FIG. 3.

The baseband signal processing device 310, the RF signal processing device 320, the processor 330, the memory device 340 in the communications device 300 have similar operations with the baseband signal processing device 110, the RF signal processing device 120, the processor 130, the memory device 140 in the communications device 100. Accordingly, FIG. 1 can be referred to for descriptions of the similar parts, and the details of these similar parts are not repeated for brevity. In one embodiment, the processor 330 can start the timer 360. When the timer expires, the processor 330 can perform corresponding programs.

Figure 4A:
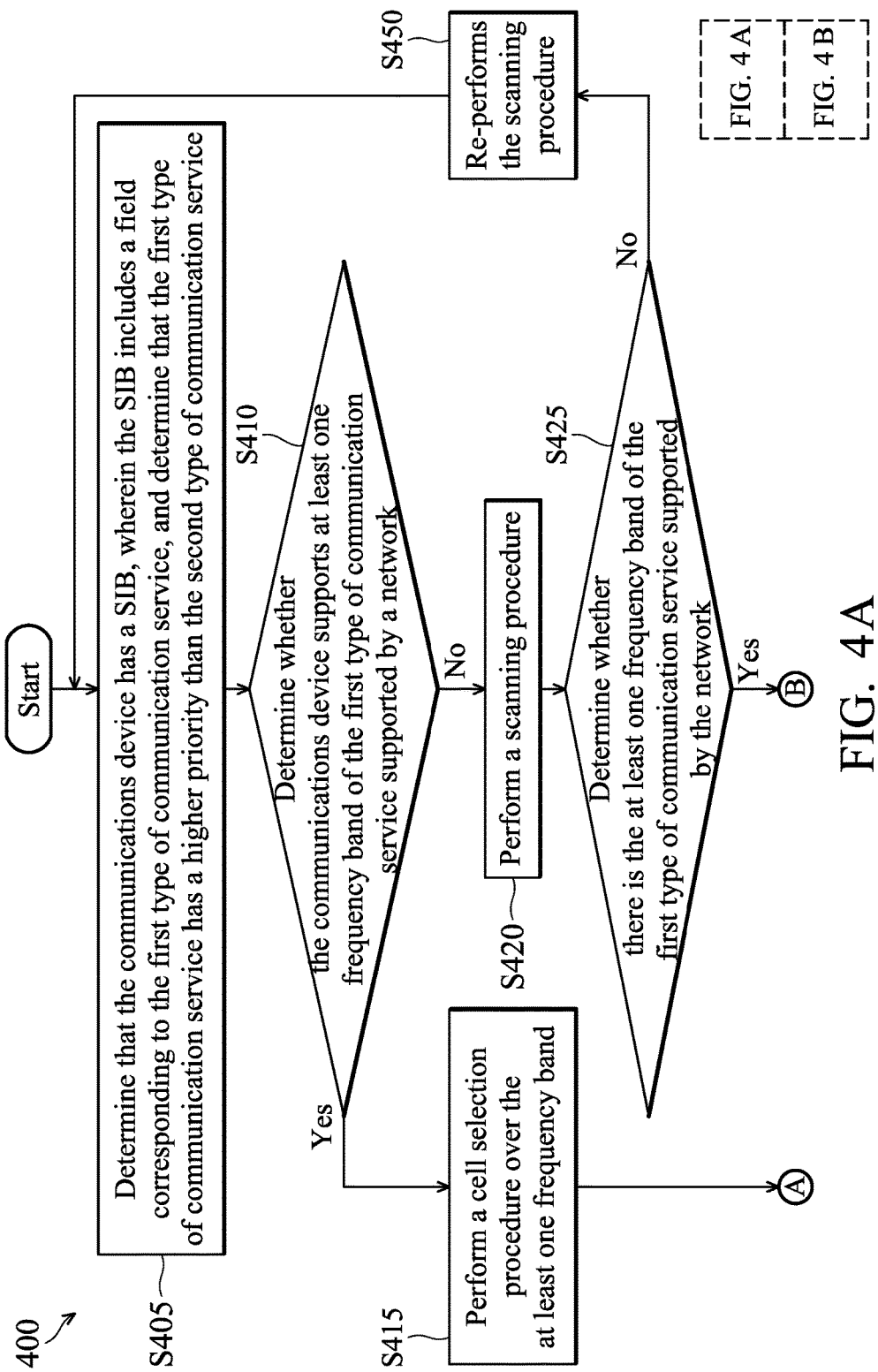
FIGS. 4A-4B show a flow chart of a method for improving frequency band support according to an embodiment of the invention.
Figure 4B:
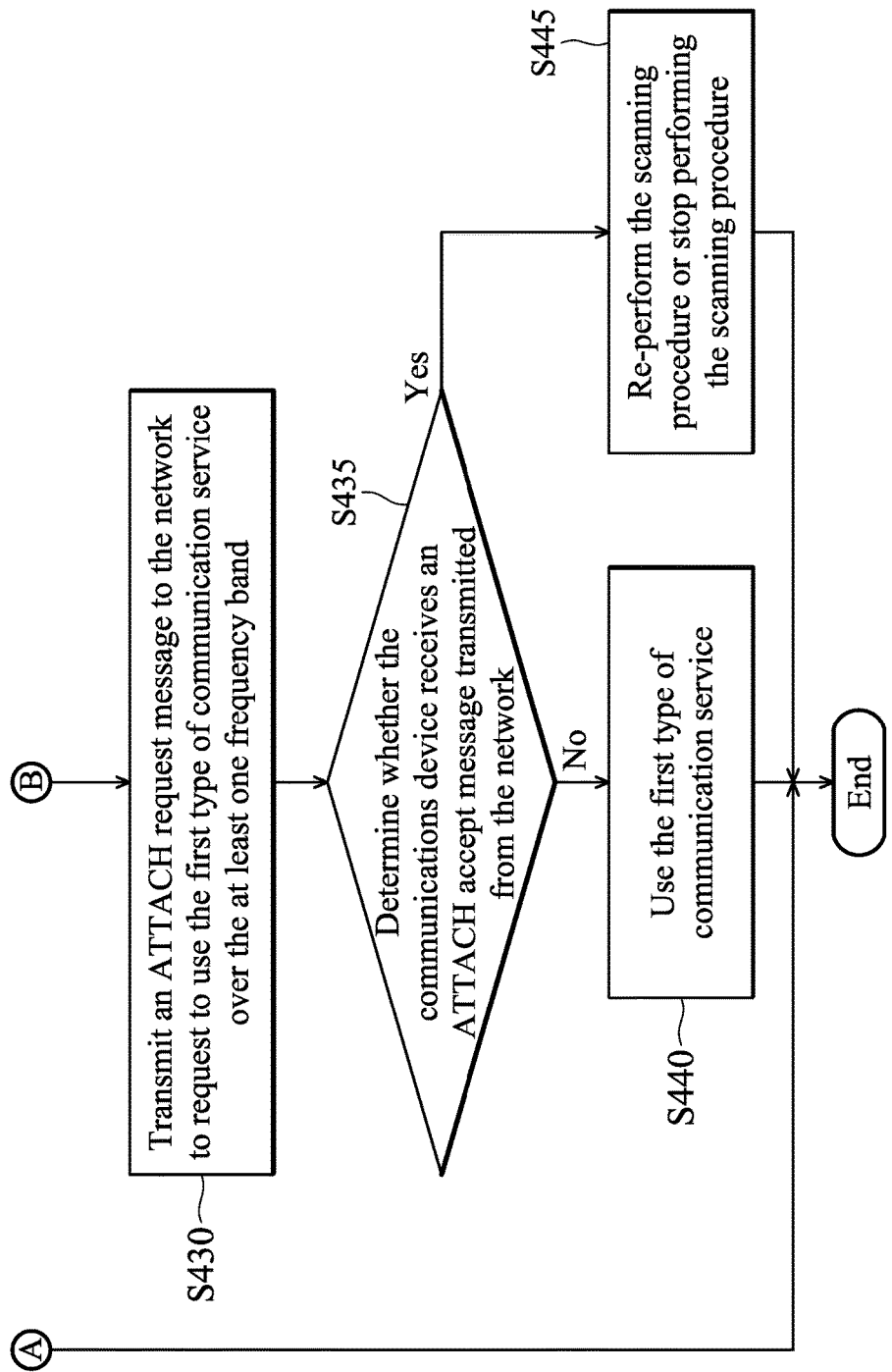

FIGS. 4A~4B show a flow chart 400 of a method for improving frequency band support according to an embodiment of the invention with reference to FIGS. 1~3. In the embodiment, it is assumed that the communications device can support two types of communication services, wherein the first type of communication service is long term evolution (LTE) service, and the second type of communication service is universal mobile telecommunications system (UMTS) service. It is further assumed that the first type of communication service has a higher priority than the second type of communication service. It should be noted that the communications device is currently camped on a cell using the second type of communication service currently.

First, in step S405, the processor determines that the communications device has a system information block (SIB), wherein the SIB includes a field corresponding to the first type of communication service (that is, the communications device supports the first type of communication service). The processor determines that the first type of communication service has a higher priority than the second type of communication service. In step S410, the processor determines whether the communications device supports at least one frequency band of the first type of communication service supported by a network. When determining that the communications device supports the at least one frequency band of the first type of communication service supported by the network, in step S415, the processor performs a cell selection procedure over the at least one frequency band.

On the other hand, when determining that the communications device does not support the at least one frequency band of the first type of communication service supported by the network, in step S420, the processor performs a scanning procedure according to a priority, wherein the scanning procedure includes scanning all frequency bands of the first type of communication service supported by the communications device.

Then, after scanning all the frequency bands of the first type of communication service supported by the communications device, in step S425, the processor determines whether there is the at least one frequency band of the first type of communication service supported by the network. When determining whether there is the at least one frequency band of the first type of communication service supported by the network, in step S430, the processor transmits an ATTACH request message to the network to request to use the first type of communication service over the at least one frequency band. In step S435, the processor determines whether the communications device receives an ATTACH accept message transmitted from the network. When determining that the communications device receives the ATTACH accept message transmitted from the network, in step S440, the processor uses the first type of communication service.

Otherwise, when determining that the communications device does not receive the ATTACH accept message transmitted from the network and instead receives an ATTACH failure message, in step S445, the processor re-performs the scanning procedure. In more detail, the processor may receive the ATTACH failure message in two cases. In the first case, when the processor determines that the communications device does not support the first type of communication service (for example, a user using the communications device does not apply to the telephone company for the first type of communication service), the processor may stop performing the scanning procedure to avoid re-performing the scanning procedure, which causes power consumption to rise. In another case, when the processor determines that the network is congested, or other problems have occurred in the network, the processor can re-perform the scanning procedure to scan available frequency bands.

Returning to step S425, when the processor determines whether there is no at least one frequency band of the first type of communication service supported by the network, in step S430, a counter counts a number of cell reselections performed by the processor if the communications device has the counter shown in FIG. 2. When the number is greater than a threshold, the processor re-performs the scanning procedure. Or, in step S450, if the communications device has the timer shown in FIG. 3, the processor starts the timer. When the timer expires, the processor re-performs the scanning procedure.

According to the method and the process described above, the first type of communication service having the higher priority can be found effectively, the battery power consumption of the communications device can also be saved effectively, and the communications device can avoid using the wrong system information provided by the cell.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communications device for improving frequency band support, comprising:
    a radio frequency (RF) signal processing device, processing a plurality of RF signals to generate a plurality of baseband signals;
    a baseband signal processing device, processing the baseband signals;
    a memory device; and
    a processor, determining whether the communications device supports at least one frequency band of a first type of communication service supported by a network when the communications device is camped on a cell using the second type of communication service; and performing a scanning procedure according to a priority when the communications device does not support the at least one frequency band,
    wherein the scanning procedure includes scanning all frequency bands of the first type of communication service supported by the communications device;
    wherein after the communications device scans all the frequency bands of the first type of communication service supported by the communications device, the processor determines whether there is the at least one frequency band of the first type of communication service supported by the network, and transmits an ATTACH request message to the network to request to use the first type of communication service over the at least one frequency band when finding the at least one frequency band.

2. The communications device for improving frequency band support as claimed in claim 1, wherein the communications device further receives an ATTACH accept message transmitted from the network, and uses the first type of communication service.

3. The communications device for improving frequency band support as claimed in claim 1, wherein the communications device further receives an ATTACH failure message transmitted from the network, and stops the scanning procedure.

4. The communications device for improving frequency band support as claimed in claim 1, wherein the communications device further receives an ATTACH failure message transmitted from the network, and re-performs the scanning procedure.

5. The communications device for improving frequency band support as claimed in claim 1, further comprising:
a counter, counting a number of cell reselections when the communications device determines that there is no at least one frequency band, and the processor re-performs the scanning procedure when the number is greater than a threshold.

6. The communications device for improving frequency band support as claimed in claim 1, further comprising:
a timer,
wherein the processor starts the timer when the communications device determines that there is no at least one frequency band, and the processor re-performs the scanning procedure when the timer expires.

7. The communications device for improving frequency band support as claimed in claim 1, wherein the communications device has a system information block (SIB), and the SIB includes a field corresponding to the first type of communication service.

8. The communications device for improving frequency band support as claimed in claim 1, before the determining step, the communications device uses a second type of communication service, wherein the first type of communication service has a higher priority than the second type of communication service.

9. The communications device for improving frequency band support as claimed in claim 8, wherein the first type of communication service is long term evolution (LTE) service, and the second type of communication service is universal mobile telecommunications system (UMTS) service.

10. A method for improving frequency band support, used in a communications device, comprising:
determining whether the communications device supports at least one frequency band of a first type of communication service supported by a network when the communications device is camped on a cell using the second type of communication service; and
performing a scanning procedure according to a priority when the communications device does not support the at least one frequency band,
wherein the scanning procedure includes scanning all frequency bands of the first type of communication service supported by the communications device;
wherein after scanning all the frequency bands of the first type of communication service supported by the communications device, the method further comprises:
determining whether there is the at least one frequency band of the first type of communication service supported by the network; and
transmitting an ATTACH request message to the network to request to use the first type of communication service over the at least one frequency band when finding the at least one frequency band.

11. The method for improving frequency band support as claimed in claim 10, comprising:
receiving an ATTACH accept message transmitted from the network; and
using the first type of communication service.

12. The method for improving frequency band support as claimed in claim 10, comprising:
receiving an ATTACH failure message transmitted from the network; and
stopping the scanning procedure.

13. The method for improving frequency band support as claimed in claim 10, comprising:
receiving an ATTACH failure message transmitted from the network; and
re-performing the scanning procedure.

14. The method for improving frequency band support as claimed in claim 10, comprising:
counting a number of cell reselections when determining that there is no at least one frequency band; and
re-performing the scanning procedure when the number is greater than a threshold.

15. The method for improving frequency band support as claimed in claim 10, comprising:
starting a timer when determining that there is no at least one frequency band; and
re-performing the scanning procedure when the timer expires.

16. The method for improving frequency band support as claimed in claim 10, wherein the communications device has a system information block (SIB), and the SIB includes a field corresponding to the first type of communication service.

17. The method for improving frequency band support as claimed in claim 10, before the determining step, the communications device uses a second type of communication service, wherein the first type of communication service has a higher priority than the second type of communication service.

18. The method for improving frequency band support as claimed in claim 17, wherein the first type of communication service is long term evolution (LTE) service, and the second type of communication service is universal mobile telecommunications system (UMTS) service.

* * * * *